July 14, 1936.  C. A. WARG  2,047,447
DUMP PLATE
Filed Oct. 24, 1930   2 Sheets-Sheet 1
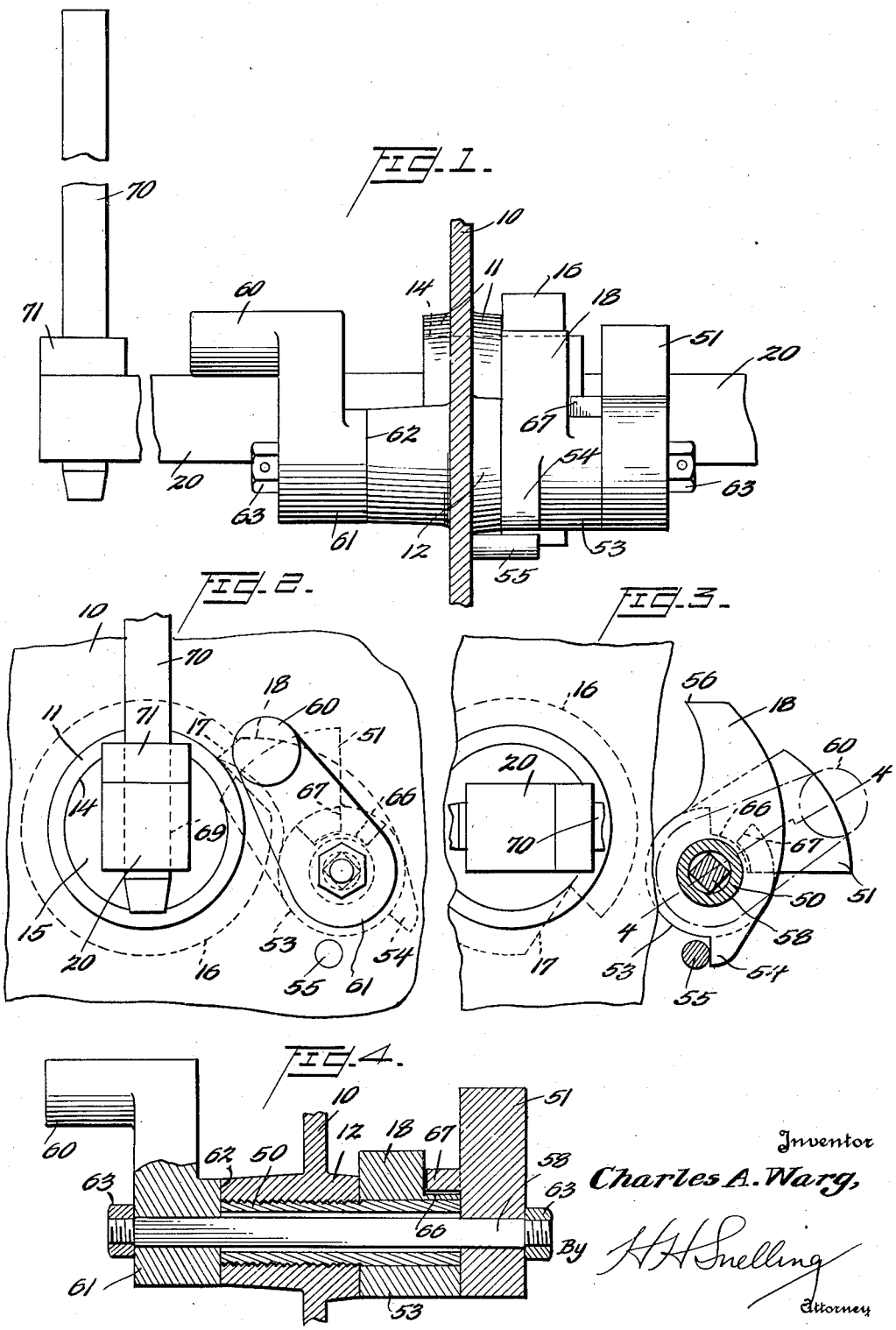

July 14, 1936.  C. A. WARG  2,047,447
DUMP PLATE
Filed Oct. 24, 1930  2 Sheets-Sheet 2
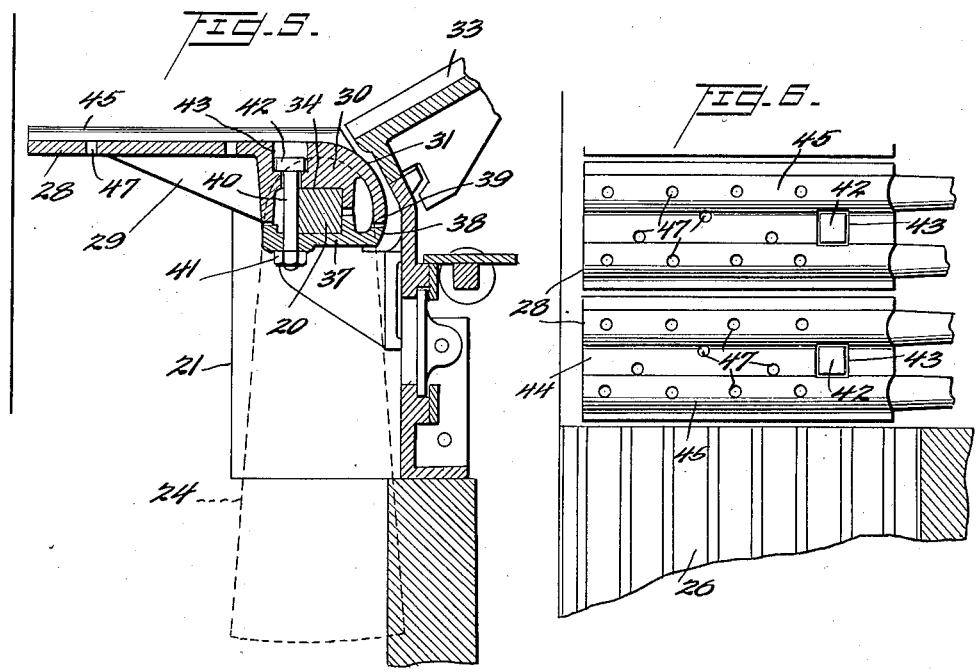
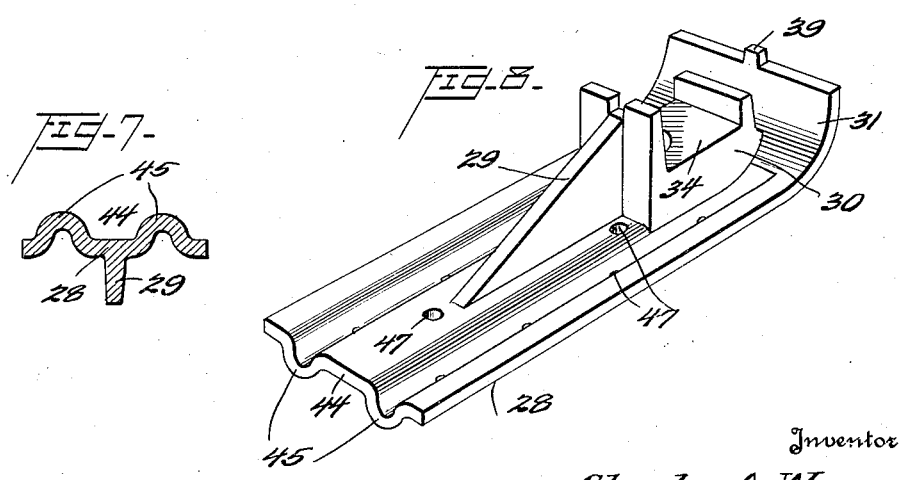
Inventor
Charles A. Warg
By H. H. Snelling
Attorney Patented July 14, 1936

2,047,447

UNITED STATES PATENT OFFICE 2,047,447

DUMP PLATE

Charles A. Warg, Scranton, Pa., assignor to McClave-Brooks Company, Scranton, Pa., a corporation of Pennsylvania Application October 24, 1930, Serial No. 491,026

7 Claims. (Cl. 110—32)

This invention relates to stokers and has for its principal object the simplification of the dump plate assembly to lengthen its life, to complete the reduction to ash of the nearly burnt out fuel that passes over the dump plate, and to make it very easy for the operator to dump the ashes from the dump plate and then return the parts to their normal horizontal position.

In ordinary practice the dump plate assembly of stokers is hard to operate because of the inherent weight of the parts and because of the rather considerable quantity of ashes that accumulate on the dump plate between the various dumpings. In the present instance much of the difficulty of handling the dump plate is avoided by counterbalancing the dump plate assembly and having the counterweight of such size as to overbalance the empty dump plate but in turn to be overbalanced by the dump plate when the latter is fully loaded with ashes.

An important object of the invention lies in the provision of a simple and efficient locking mechanism which not only holds the dump plate firmly in normal horizontal position but which is easily manipulated by the operator, and which enables the workman to dump and to restore the dump plate assembly with minimum effort. Other objects relate particularly to the individual dump grate bars which together make up the dump plate.

In the drawings:

Figure 1 is a side elevation showing the entire assembly.

Figure 2 is a front view illustrating primarily the latch which is shown in normal position.

Figure 3 is a similar view but showing the dump bar shaft in dumping position.

Figure 4 is a section on line 4—4 of Figure 3 illustrating primarily the specific structure of the latching mechanism.

Figure 5 is a cross section thru one of the dump grate bars on line parallel to its longitudinal axis.

Figure 6 is a top plan view of a portion of the dump plate.

Figure 7 is a transverse cross section thru one of the dump grate bars.

Figure 8 is a bottom perspective of a dump grate bar.

The stoker front 10 has integral bosses 11 and 12, each extending on both sides of the main web of the casting, the stoker in the specific form chosen to embody the invention for illustrative purposes being an underfeed stoker with a central retort and dump plates at each side. The boss 11 has a circular bore 14 therein thru which passes a cylindrical bearing 15 projecting forwardly from a collar 16 which has a notch 17 to cooperate with the latch 18 later to be described. The collar 16 and the cylindrical bearing 15, which are preferably integral, have centrally thru them a square opening to receive the dump bar shaft 20 which has a bearing in the stoker rear frame plate 21, the shaft 20 extending beyond the rear frame plate and receiving in a space formed in the rear furnace wall a counterweight 24 which is secured against axial movement on the shaft by means of a set screw (not shown).

On this square shaft 20 between the dead plate 26 and the rear wall 21 are mounted a plurality of separate dump grate bars 28, each in two parts, the major portion consisting of a corrugated top strengthened by a vertical triangular reenforcing rib 29 integral with the hub portion 30 which latter has a cylindrical surface 31 to close, as far as possible, the space between the dump plate and the sloping grate bars 33. The hub portion has a rectangular slot 34 to receive the upper half of the dump bar shaft 20, and the lower cooperating cap portion 37 of the dump grate bar is similarly slotted and has a cooperating cylindrical surface 38 thru the center of the edge of which there is a small V-slot to receive a similarly shaped V-tongue 39 extending from the main portion of the dump grate.

A bolt 40 passes thru alined openings in the major portion of the dump grate bar and the bottom cap and receives a nut 41. The head 42 of the bolt lies deep in a pocket 43 while its stem lies parallel to and abuts one face of the square shaft 20. The deep pocket 43 in use becomes filled with ashes thus protecting the bolt head from the effects of the heat and also preventing leakage of air. The corrugations on the top of the dump grate bars are quite important as the valleys 44 between the ribs 45 partly fill with ashes to protect the metal and the space between adjacent ribs 45 is sufficiently great to aid in the breaking up of the clinkers. Air holes 47 are provided thru the tops of the ribs and in addition thru the valleys. It has been found in practice that the best results are obtained by having the holes thru the ribs alined as are the corresponding holes and ribs in the grate bars 33 and to have the air holes thru the valleys less in number and staggered, being located as close as possible to the stiffening rib 29.

Due to the extension of the dump grate bars to one side only of the dump bar shaft 20, it is extremely difficult, if not impossible, to balance the dump grate bars individually and consequently use is made of the counterweight 24, located, as it is, in a very convenient position. For best results this large casting is of such size and thickness as to overbalance all of the dump grate bars but to be less in weight than the loaded dump plate assembly minus the counterweight. By thus selecting the weight of the casting 24 the fireman needs only to move the difference in weight between the counterweight and the dump grate bars in restoring the dump plate to its normal horizontal position and to lower only about half of the weight of the ashes when dumping the assembly. Even this greatly lessened weight is considerable and if the latch 18 were used alone it would take some little force to move it from latching position. To this end there is provided a special latching mechanism best shown in Figures 1, 2 and 3.

Thru the bosses 12 on opposite sides of the furnace front extends a hollow bearing 50 which may be threaded into the tapped bosses or otherwise secured in place. This bearing 50 positions the latch counterweight 51 and supports the latch 18 which is loose on this hollow cylindrical piece. The latch 18 has a circular hub 53, from the side nearest the furnace front of which projects a stop lug 54 which engages the pin 55 to prevent the edge 56 of the latch from passing a plane vertically thru the axis of the bearing 50 and the square shaft 58 which is supported therein. This position is illustrated in Figure 3 and the other extreme of movement of the latch is shown in Figure 2, with the latch or pawl holding the dump bar shaft by engagement of the flat face of the latch with the flat face of the notch 17.

The latch handle 60 has a hub 61 which engages somewhat freely the front flat face 62 of the boss 12. The hub has a square hole therethru to fit the shaft 58 and the latch counterweight 51 likewise has an opening to receive this square shaft, the two ends of which are reduced to receive the nuts 63 which keep the latch unit assembled and in position. The latch 18 on its face away from the furnace front has a circular extension in the top of which is an arcuate notch 66, the stop faces of which are in planes at right angles to each other, each being 45° from vertical when the latch is in normal holding position. An arcuate lug 67 with its two radial faces at 45° from each other, i. e., half of the arc of the notch, projects from the latch counterweight toward the furnace front 10 and rides at all times within the notch 66.

The operation of the device is as follows: The dump bar shaft 20 has an opening 69 therethru to receive one end of the operating handle 70 which carries a shrunk-on positioning collar 71. While holding the operating handle slightly to the left of vertical position, the latch handle 60 is thrown to the right as seen in Figure 2. Thru the first 45° of travel of the latch handle and latch counterweight, both of which necessarily move with the square shaft 58, no movement of the latch itself is had, but during the last 45° of movement of the latch handle 60 the lug 67 has engaged the far face of the notch 66 and thru this final 45° of travel the latch handle carries the latch with it until the parts reach the position illustrated in Figure 3 at which time the counterweight 50 and the handle 60 overbalance the latch and hold it out of engagement with the notched collar 16 on the square dump plate shaft 20. The workman is now free to lower the dump plate assembly by movement of the operating handle 70 to the right and when the dumping operation is complete he may return the dump grate bars to horizontal position. The handle 60 may be thrown into almost the position shown in Figure 2 so that as soon as the radial face of the notch 17 passes the edge 56 of the pawl or latch the dump plate assembly will be locked in normal position. It will be noted that the lost motion between the counterweight and the latch permits the counterweight to hold the latch in or out of position in a very positive manner, this permitting the workman to hold both hands on the operating handle when desired.

What is claimed as the invention is:—

1. A stoker including a dump plate shaft extending forwardly and rearwardly through the stoker, the outer end being actuable during dumping operations, a dump plate mounted on said shaft, a latch for engaging said shaft for holding the dump plate in a normally horizontal position, and a counter weighted means for retracting said latch to permit the dump plate shaft to turn with the dump plate for dumping, said counter weighted means having a lost motion connection with said latch whereby said means may be moved to a position to cause the latch to free the shaft upon reverse movement of the shaft to release the latch from the weight of the ashes, thus permitting the operator to use both hands in holding the outer end of the dump plate shaft, while the counter weighted means is being moved thru the last angular movement in the latch retracting step where it holds the latch out of shaft engagement, and such operator may use both hands to move the shaft to dump the ashes.

2. A stoker including a dump plate shaft extending through the stoker, a dump plate mounted on said shaft, a latch for engaging said shaft for holding the dump plate in a normally horizontal position, counterweighted means for retracting said latch to permit the dump plate shaft to turn with the dump plate for dumping, said means including a weight positioned so as to hold the latch in latched position until the latch retracting means has turned a portion of its travel to release the latch at which time the weight will be acted upon by gravity to aid in further movement of the latch and insure the latch moving away from the dump plate shaft.

3. A stoker including a dump plate shaft extending forwardly and rearwardly through the stoker, the outer end being actuable during dumping operations, a dump plate mounted on said shaft, a counter-weight on said shaft, of such a size as to overbalance the empty dump plate and support it in a horizontal position but in turn overbalanced by the dump plate when the latter is fully loaded with ashes, a pivoting means adjacent said shaft, a latch mounted to turn on said pivoting means for engaging said shaft for holding the dump plate in a normally horizontal position, and means for retracting said latch to permit the dump plate shaft to turn with the dump plate for dumping, said means including a counter weight having a lost motion connection with said latch and adapted in one position to hold the latch in engagement with the shaft and in another position to urge the latch away from the shaft, said two positions constituting the two limits of the lost motion.

4. In a stoker, a dump plate shaft, a handle for moving said shaft to dump ashes, a notched latch engageable with the shaft to hold the shaft in ash supporting position, a counterweight movable with the latch but provided with a lug movable in the notch of the latch and having lost motion with respect thereto, said counterweight having sufficient mass to overbalance the latch when free and lying at one extreme of its lost motion in position to hold the latch against the shaft, and in the other extreme of its lost motion to hold the latch in position to be freed as soon as the latch is relieved of the binding action caused by the weight of ashes supported by the shaft, and means for moving the counter weight from one to the other of its positions thereby to control the latch.

5. In combination, a shaft, an operating handle and a counterweight member both movable with said shaft, a latch member pivotally mounted to turn about said shaft, a projection on one of said members, the other of said members being provided with a recess in which said projection extends thereby providing a connection between the counterweight and the latch, and a rocking shaft having a notch into which said latch is engageable.

6. In combination, a shaft, an operating handle and a counterweight member both movable with said shaft, a latch member pivotally mounted to turn about said shaft, a projection on one of said members, the other member having a slot in which said projection extends thereby providing a connection with angular play in it between the counterweight and the latch whereby the counterweight is turned thru a greater angle than the latch in operating the latch, and a rocking shaft having a notch into which said latch is engageable.

7. In a stoker, a dump plate shaft having a recessed member thereon, a stop spaced from said shaft, a latch pivoted to swing thru an arc limited on the one hand by engagement in the recess of said member and on the other hand by engagement with said stop, means for swinging the latch thru said arc comprising a counter weight pivoted to turn thru an arc over and above its own pivotal axis, the limits of motion of the counter weight being determined by the two positions of the latch as it rests against the member and the stop respectively, a lost motion connection between the counterweight and the latch whereby the arc of movement of the weight is greater than that of the latch and whereby the counterweight normally holds the latch at one or the other of said limits, said means being connected to move the counterweight thru said lost motion into jarring engagement with said latch to move the latter out of latching position.

CHARLES A. WARG.